United States Patent [19]
Dawson

[11] 3,961,197
[45] June 1, 1976

[54] X-RAY GENERATOR

[75] Inventor: John M. Dawson, Los Angeles, Calif.

[73] Assignee: The United States of America as represented by the United States Energy Research and Development Administration, Washington, D.C.

[22] Filed: Aug. 21, 1974

[21] Appl. No.: 499,221

[52] U.S. Cl. .......................... 250/493; 331/94.5 R; 331/94.5 P; 331/94.5 G
[51] Int. Cl.² ..................... H01S 4/00; G21G 4/00
[58] Field of Search .................... 331/94.5; 330/4.3; 250/493, 494

[56] References Cited
OTHER PUBLICATIONS
Duguay, Proc. Int'l. Conf. on Inner Shell Ionization Phenomena, etc. Apr. 17–22, 1972, pp. 2350–2363.

*Primary Examiner*—Robert J. Webster
*Attorney, Agent, or Firm*—Dean E. Carlson; Cornell D. Cornish

[57] ABSTRACT

Apparatus and method for producing coherent secondary x-rays that are controlled as to direction by illuminating a mixture of high $z$ and low $z$ gases with an intense burst of primary x-rays. The primary x-rays are produced with a laser activated plasma, and these x-rays strip off the electrons of the high $z$ atoms in the lasing medium, while the low $z$ atoms retain their electrons. The neutral atoms transfer electrons to highly excited states of the highly striped high $z$ ions giving an inverted population which produces the desired coherent x-rays. In one embodiment, a laser, light beam provides a laser spark that produces the intense burst of coherent x-rays that illuminates the mixture of high $z$ and low $z$ gases, whereby the high $z$ atoms are stripped while the low $z$ ones are not, giving the desired mixture of highly ionized and neutral atoms. To this end, the laser spark is produced by injecting a laser light beam, or a plurality of beams, into a first gas in a cylindrical container having an adjacent second gas layer co-axial therewith, the laser producing a plasma and the intense primary x-rays in the first gas, and the second gas containing the high and low atomic number elements for receiving the primary x-rays, whereupon the secondary x-rays are produced therein by stripping desired ions in a neutral gas and transfer of electrons to highly excited states of the stripped ions from the unionized atoms. Means for magnetically confining and stabilizing the plasma are disclosed for controlling the direction of the x-rays.

10 Claims, 7 Drawing Figures

X-RAY GENERATOR

BACKGROUND OF THE INVENTION

This invention was made in the course of, or under a contract with the United States Atomic Energy Commission.

In the field of medicine it is desirable to produce x-rays for the treatment of diseases, such as cancer, as well as for diagnostic purposes; moreover, the production of x-rays has been of wide utility to industry and of great interest to physicists. Various means and methods have long been used for the production of x-rays, such as Roentgen's pioneering use of a Crooke's tube to produce fluorescence of a barium platinocyanide screen, and this led within a few weeks of Roetgen's discovery to the use of x-rays for practical purposes, e.g. by surgeons to examine the bones of living people, and latter for the detection of flaws in metals.

The x-rays known heretofore have generally been produced by bombarding cathode rays against solid targets. The greater the speed of the cathode particles the more penetrating, or the "harder" the x-rays produced have been. While the earlier tubes were of the Crooke's type, which depended on the conduction of an ionized gas, those most used now are thermionic, of the Coolidge type, with a hot wire cathode operating in a high vacuum so as to permit the passage of very high-speed electrons under voltage control, the quantity of electrons, and the intensity of the resulting x-rays, whose wavelengths range from the extreme ultra violet into the gamma region, i.e. from $10^{-7}$ to $10^{-9}$ cm, being regulated by the voltage applied to the tube. X-rays are also produced when electrons, accelerated in a vacuum, strike a target and lose kinetic energy in passing through the strong electric fields surrounding the target nuclei, thus giving rise to bremsstrahlung. However, all these x-rays have been non-coherent, have had a broad band of wavelengths, or they have been difficult or expensive to control or regulate.

SUMMARY OF THE INVENTION

This invention provides a method and apparatus for producing coherent monochromatic x-rays by mixing highly stripped and neutral atoms. To this end a laser spark is used to produce first incoherent x-rays that are used to produce the desired coherent monochromatic x-rays. For example, the laser light produces a plasma in a container means for a first gas in accordance with U.S. Pat. No. 3,764,466, and this plasma produces primary x-rays that result in highly stripped high $z$ ions in a neutral gas. The latter is provided in a mixture of heavy and light gases to produce transitions of electrons from the neutral light atoms to highly excited states of the heavy highly stripped atoms and then from their higher energy states to their K, L . . . energy states. More particularly, this invention provides a focused laser light beam spark in a longitudinally extending container to produce x-rays in a gas mixture of elements having respectively an atomic number $z$ above and below 10. Magnetic means are provided for insulating and stabilizing the plasma produced and heated by the laser inside the container means. Also provided are an x-ray transmitting ultra violet filter for the primary x-rays between the laser heated plasma and the other gas mixture and end plates for extracting the desired x-rays.

In one embodiment this invention provides a system of longitudinally extending container means for specific gases, laser means for selectively energizing the gases for selectively interacting them along the axis of the container means, and means for extracting the desired x-rays from the container means along the axis of the container means. More particularly, in this embodiment this invention provides a first longitudinally extending outer cylindrical container means having magnetic means on the outside thereof and a co-axial ultra-violet ray inner shield means on the inside thereof forming another container means along the same axis; transparent means for closing the ends of both the container means and the inner shield means; means for filling said inner shield means with a first gas; means for filling the first outer container means with another gas, the latter gases selected from the group consisting of elements having respectively an atomic number $z$ above and/or below 10; and laser spark means for heating the one gas along the shield means through one end thereof to form an x-ray transmitting plasma therein that is confined by the magnetic means, the x-rays passing through the shield means selectively to ionize the heavier element in the other container while the low $z$ gas remains neutral and forms a neutral gas mixture with the heavier ionized gas ions on the same side of the shield means so that the ions interact with the neutral gas atoms to produce the desired excited and ground states for producing the desired coherent monochromatic x-rays that are directed along the axis of the container and the shield means.

It is an object of this invention, therefore, to produce coherent monochromatic x-rays.

With the proper selection of element and steps and their proper sequence, arrangement and sequence respectively, as described in more detail hereinafter, the desired x-rays are produced.

BRIEF DESCRIPTION OF THE DRAWINGS

In the drawings, where like elements are referenced alike.

DESCRIPTION OF THE PREFERRED EMBODIMENT

This invention is particularly useful for producing x-rays for medical diagnosis and/or the treatment of diseases, such as cancer, but it is also useful in the field of physics and in industry for the wide variety of applications to which the x-rays known heretofore have been used. Additionally, this invention has utility in any field where coherent and/or monochromatic x-rays are required.

Figure 1:
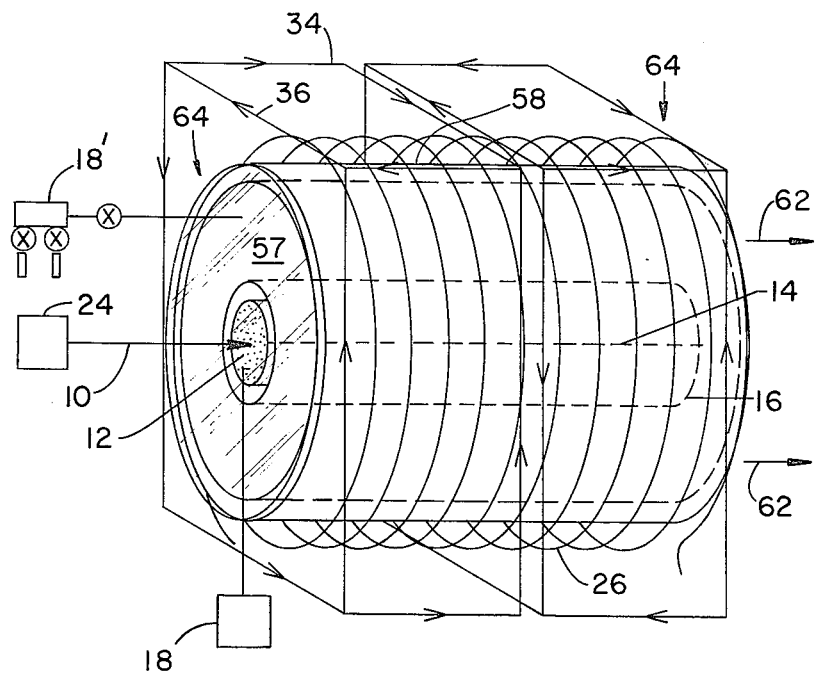
FIG. 1 is a partial three dimensional view of one embodiment of this invention; FIG's. 1a and 1b are cross-sections.

Referring now more particularly to FIG. 1, it is known that a longitudinally extending gas column can be heated by a focused laser beam 10 to produce a plasma in a longitudinally extending column 12. Moreover, this plasma column can be stably confined by a magnetic field along an equilibrium axis 14. For example, when gas is introduced into a cylindrical tube 16 from a source 18 and the fuel is heated by a laser light beam 10 from laser 24 to produce a plasma column 12, the radial outward plasma pressure is resisted by a B strength magnetic field having a radial inward magnetic field pressure that balances the plasma pressure in a ratio of pressures that is denoted by $\beta$. Such a magnetic field is provided by a normal resistance or superconducting solenoid 26 of FIG. 1, the solenoid having magnetic mirrors 28 periodically placed at spaced apart locations along axis 14 to decrease the flow of the plasma out the ends of the tube 16. To prevent the plasma column from being displaced side ways (the so-called $m = 1$ instability) stabilizing means are also provided, as described in U.S. Pat. No. 3,764,466 by the inventor of this invention. For example, minimum B magnetic field stages are provided by quadrupole conductors 34, and the current directions are rotated 90° from stage to stage, as shown in FIG. 1 by the arrows 36 to enhance the stability. This produces a strong focusing magnetic confining field as described in U.S. Pat. No. 3,677,890 to C. W. Hartman.

Figure 2:
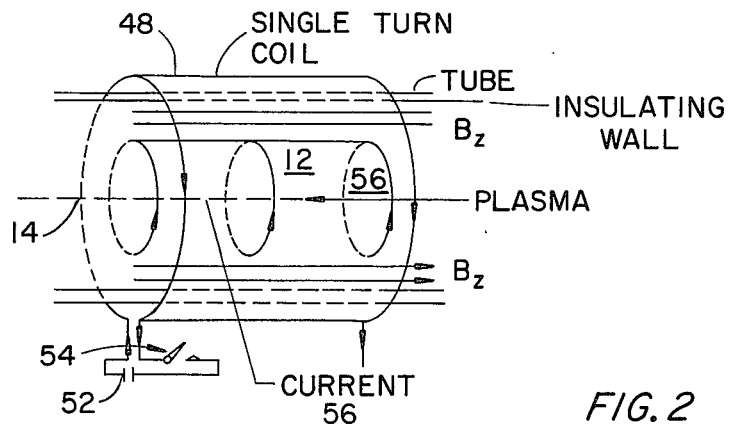
FIG. 2 is a partial three-dimensional view of the pulsed $\theta$ coil means of FIG. 1.

In order to increase the density of the plasma column 12 a technique referred to as a theta pinch can be applied, as described in the above-cited patent. To this end, a single turn coil 48 may be pulsed in addition to the solenoid 26. As shown in FIG. 2, the pulsed coil 48 is employed with a pulsed energy source, such as a large capacitor bank 52 having a suitable switching system 54. This procedure applies a rapidly increasing axial magnetic field that compresses the plasma inwardly toward axis 14 and produces an azimuthal plasma current 56 in plasma column 12 along axis 14, as described and shown on page 415 of "Controlled Thermonuclear Reactions," by Glasstone and Lovberg, Van Nostrand, 1960. The heating that occurs in the first stage of the compression is considered to be similar to that in the conventional dynamic pinch. To this end, a thin cylindrical sheath of plasma, formed near the walls of the inner discharge tube 16, is driven inward toward the axis 14 with a velocity greatly in excess of the speed of sound. The fast moving sheath, acting as a magnetic piston, sweeps the plasma particles before it, thereby increasing the energy density that is confined.

Now should the gas in tube 16 be a gas having a high z whose atomic number is above 10 on the periodic chart, and should the gas in tube 16 be magnetically confined axially, the laser beam 10 will ionize the gas and cause it to produce an intense pulse of x-rays that are directed radially outwardly from axis 14, and these primary x-ray can then be used to produce the desired coherent secondary x-rays. To this end, should the tube 16 be arranged in accordance with this invention inside outer gases in such a way that the intense primary pulse of x-rays produced in the described plasma gas column 12 are directed into outer gases having a density less than liquid density, a volume of at least $10^{-4}$ cm$^3$, and atomic numbers z greater and less than 10, the intense primary x-ray pulse selectively ionizes one of the outer gases, i.e. the high atomic number gas so as to mix the same with the neutral atoms, i.e. the low atomic number gas, and this mixing produces high energy level orbital electrons that return to their ground state to produce coherent, monochromatic secondary x-rays that can be extracted along the axis of tube 16 co-axial therewith.

As shown in FIG. 1, in one embodiment the tube 16 is transparent to the x-rays produced in the plasma gas column 12 by the laser light beam 10, and the high and low atomic number gases are held around tube 16 and between plugs 57 at the ends of tube 58 that is arranged around tube 16 and is co-axial therewith along axis 14. Another source 18' provides the outer gas. Thus, the laser spark produces the primary x-rays in the plasma gas column 12, and the high atomic number gas atoms therearound are ionized and highly stripped of their electrons by the x-rays passing therethrough and through tube 16 from plasma gas column 12. Meanwhile, the neutral low-z gas atoms remain unionized and they mix with the highly stripped high z ions around tube 16 and in tube 58 and transfer electrons to highly excited states of the highly ionized ions. Thereupon, when these raised electron energy levels return to their ground states, they produce and direct the desired coherent monochromatic secondary x-rays in a annular collimated beam 62 that shoots out the ends 64 between tubes 16 and 58 along axis 14.

In the operation of this above-described embodiment, gas, referred to hereinafter as the inner gas, is filled into the central tube 16 through a suitable inlet, and the gas referred to hereinafter as the outer gas, is filled into the outer tube 58 through suitable inlets from conventional sources. Thereupon, the solenoid 26 is energized with a high constant unidirectional current, and the described laser spark system of this invention, which is provided by laser beam 10, ionizes the inner gas. This ionized gas, which is confined as a plasma gas column 12, transmits an intense pulse of primary x-rays into the outer gases through a tube 16 that blocks the transmission of ultra violet rays therethrough. This system causes the high z atoms in the outer gas to be ionized and highly stripped of their orbital electrons, and these highly stripped ions mix with the neutral low z atoms to produce highly excited high z ions by transfer of electrons from low z atoms. Thereupon, the high energy level high z atom electrons return from their raised energy levels to their ground states to produce short wave length electromagnetic wave energy in the form of an annular beam 62 of coherent monochromatic x-rays that are collimated and directed out ends 64 between tubes 14 and 58 along axis 14.

In operation, the mirrors 28 are spaced one ion mean free path apart. This reduces the plasma flow to that of a viscous fluid flowing through a rough pipe. Thus, when the laser 24 focuses down the axis 14 of the solenoid 26 into the gas in tube 16, the focused laser beam 10 produces x-rays in a discharge, spark in the gas. However, it can alternately produce these x-rays in a plasma that is pre-ionized and heated by other means, such as any of the conventional rf sources described in the cited patent, or the art cited thereby.

The plasma column 12 acts like a light pipe and traps the laser beam, since the laser beam causes the plasma to expand radially away from the axis 14 so that the plasma density is lower along the axis and higher therefrom toward the inside wall of tube 16. A density gradient of less then 10% is more than enough to trap the beam, as has been shown dramatically in the actual experiments reported by N. A. Amherd and G. C. Vlases, Proceedings of Second APS Topical Conference on High-$\beta$ Plasma (Max Planck Institute for Plasma Physics, Garching, IPP 1/127, 1972) p. 241. Once the profile is formed, it is stable since the strong heating in the center causes the plasma to expand there, dropping the density further. Since the plasma tends to expand axially toward the ends 64 of tube 16, the length of the tube must be long enough so that the plasma does not leave before most of the energy is radiated as x-rays. This requires $nt = 3 \times 10^{14}/z$ for a 1 Kev plasma or a length $1 = 10^{22}/nz$. For $n$ equal $10^{18}$ and $z = 50$ this gives $1 = 200$ cm. The mirrors 28 decrease the flow by a large factor of the order of 10–100 from the freely expanding plasma flow velocity and thus a similar reduction in length occurs. But, in accordance with this invention, the ends 64 of tube 16 are plugged with transparent, laser light transmitting, solid material in the form of plugs 57, as described in more detail hereinafter, and this also achieves a reduction in the length of the tube 16 by a factor of 2 ro 3 over that required for a freely expanding plasma. Moreover, the plasma is doped with a high $z$ material that reduces the required length of column 12. Thus, the focused laser light beam pulse produces an intense pulse of x-rays in the minimum B, mirror confined plasma column 12, and this intense x-ray pulse is directed radially outwardly away from the equilibrium axis 14 of the plasma column 12 toward the outer gas, which produces the desired x-rays that are directed in accordance with this invention out the ends 62 of tube 58.

Figure 3:
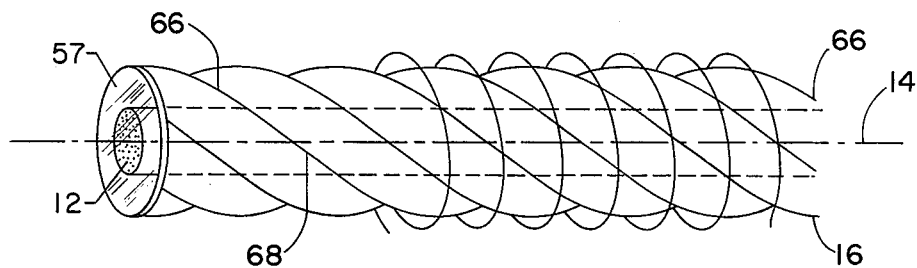
FIG. 3 is a partial three-dimensional view of another embodiment of the stabilizing means of FIG. 1.

In the modification of FIG. 3, a helical $l = 2$ coil 66 is used in place of the strong focusing quadrupoles of FIG. 1 to provide a strong focusing confining field for stabilizing the plasma column axis 14 against sideways displacement toward the inside wall of the inner discharge tube 16. To this end, the four alternate windings 68 of helical coil 66 are equally spaced co-axially with axis 16 and energized adjacently oppositely with unidirectional currents around tube 16.

Figure 4:
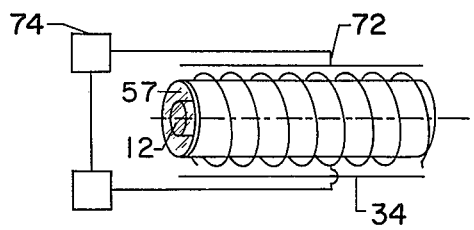
FIG. 4 is a partial cross-section of another embodiment of the stabilizing means of FIG. 1.

In the modification of FIG. 4, feedback stabilization is used to prevent sideways displacement of the plasma column against the inside wall of the discharge tube 16. To this end, an optical sensor probe 72 detects the plasma displacement, produces a signal corresponding to this displacement, this signal is fed into a suitable control 74, and this control selectively feeds back a signal into the appropriate conductor 34 magnetically to oppose the plasma column displacement. Such a system is described in U.S. Pat. No. 3,733,248 by Hendel et al. and shown in FIG'S. 7–8 thereof. Also, a suitable dynamic stabilization system can be used, as described in U.S. Pat. No. 3,668,066 by Hendel et al.

Figure 5:
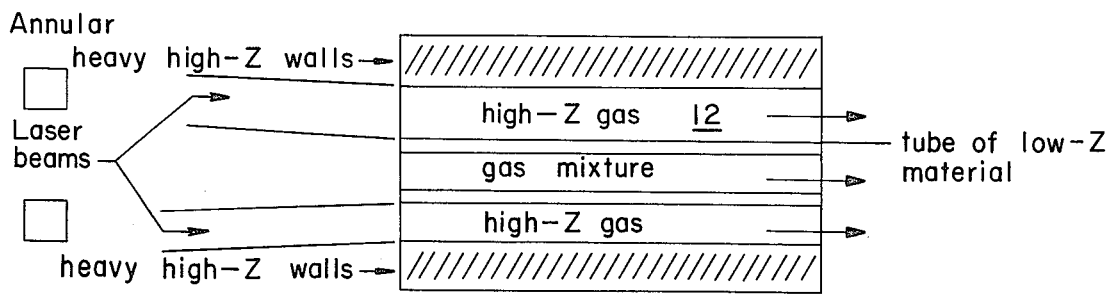
FIG. 5 is an- FIG. 5 is another embodiment.
Figure 1A:
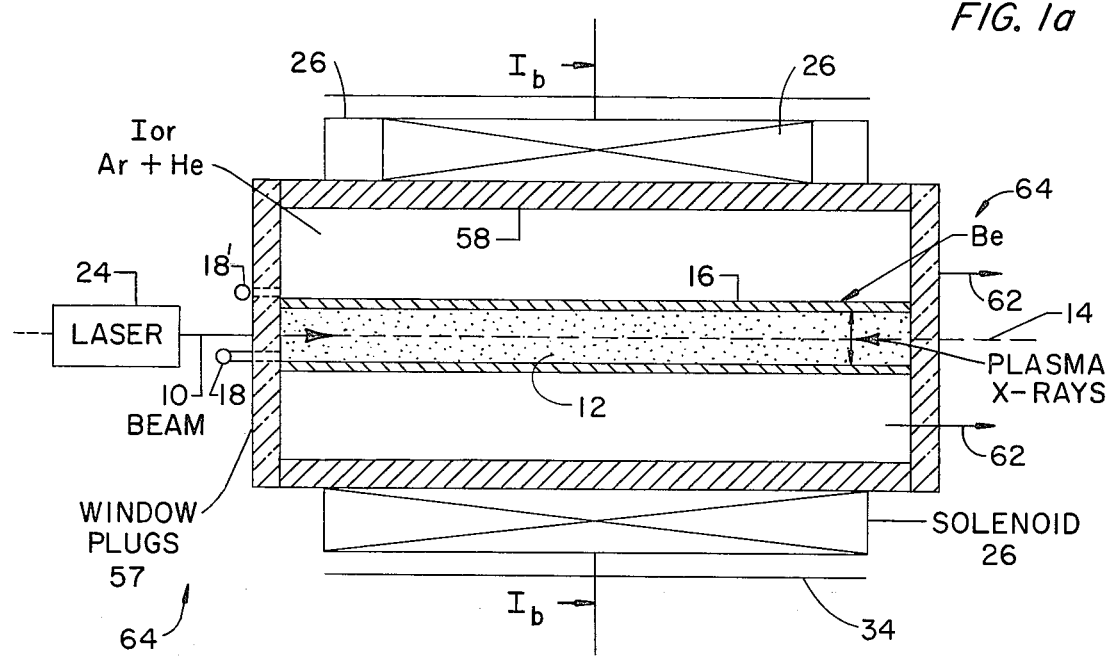
Figure 1B:
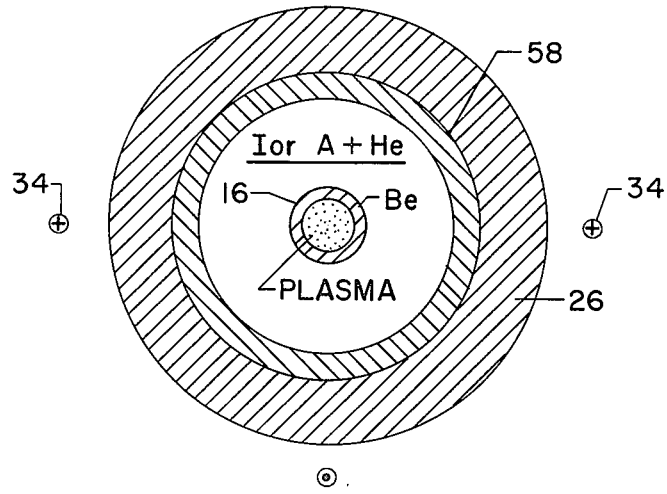

In the modification shown in FIG. 5, the co-axial cylindrical tubes have transparent end-plugs 57, but at the center the center cylindrical tube 16 contains at one atmosphere the laser mixture of high $z$ and low $z$ gases, such as argon and helium. This is isolated from a high z gas primary x-ray source in the outer tube 58 by the thin wall of a low z material, such as a 10 micron thick wall tube of Be having an inside diameter of $10^{-2}$ cm. The Be wall acts as a filter to allow only x-rays with an energy greater than 1 keV to pass through the inner tube 16 to the center of the inner tube. Outside this Be cylinder is an annular region of high z gas, such as Xe, about 0.01 cm thick and at about 1 atmosphere. This outer gas is heated in a column 12 to a high temperature of at least 1 keV by at least one intense annular laser beam 10 from a Nd or $Co_2$ laser 24. It will be understood, however, that this outer gas may be heated alternately by an intense current, such as by ohmic heating.

The x-rays emitted from the outer high z gas penetrate the central tube 16 and preferentially ionize the high z gas therein. Charge exchange in the low z gas produces an inverted population, which lases in the x-ray region, as understood from the above-described other emodiments. The heavy high z material in the outside tube 58, such as U or Pb, serves to back scatter x-rays into the center tube 16. Also, under the intense x-ray flux from the high z gas the high z outer tube 58 material will fluoresce and enhance the x-ray intensity in the interior.

In operation, laser energies for the laser or lasers 24 for the described device are in the range of 250 joules/cm. of length that are delivered in $10^{-10}$ sec., as this is about the collapse time for the central tube 16. By using the described magnetic fields throughout the volume, the collapse of the inner tube is prevented. Also, the described magnetic fields and means 26 described above reduce electronic heat conduction to the outer heavy high z material of tube 58 around the outside of the outer gas.

The following are examples of this invention:

EXAMPLE I

A 0.1 cm. diam. gas having an effective $z$ of 50, or that is doped to that effect, e.g. Xe is filled to an atomic density of between $10^{17}$ and $10^{19}$ particles/cm$^3$ in a cylindrical inner Be discharge tube having a length of up to 30 cm. or more in a 300 kG axial magnetic field. There may be individual 500 kG magnetic mirrors spaced 1 cm apart. Advantageously, axial solenoid and $\theta$ pinch magnetic fields are combined with minimum B 90° rotated, quadrupole magnetic fields to produce the desired stabilized pinch along the equilibrium axis of the discharge tube; however for the short time required here this may not be necessary. The ends of the tube are vacuum sealed by transparent plugs that transmit 10.6$\mu$ wavelength laser light. For example, Cd telluride crystal plug ends are transparent to 10.6 $\mu$ wavelength $Co_2$ laser light, but Irtran II brand windows or other conventional windows can alternately be used. A focused beam of laser light rays having a tailored time duration, amplitude and wave shape is directed into the gas in the inner tube along the axis thereof to heat the gas therein and to form a plasma therefrom having a temperature of up to 1 keV. For example, the beam is transported, amplified and focused by suitable mirrors, amplifiers and lenses respectively to have parallel collimated rays or rays focused to a small spot size having an intensity of a gas breakdown level of $10^9$ watts/cm$^2$ to $10^{14}$ or more watts/cm$^2$ in a prepulse and a main pulse of from $10^{-12}$ seconds in duration, as described in U.S. Pat. No. 3,723,246. Suitable existing laser energy levels for various plasma column lengths and/or diameters are discussed in the above-cited patents, but these may be varied by conventional means, as discussed in U.S. Pat. Nos. 3,699,474; 3,723,703; 3,766,004; 3,624,239; 3,757,249; 3,489,645; 3,414,835; 3,378,446. Moreover, pulsed laser beams of up to 300 billion watts, which were reported in the N.Y. Times during the week of Sept. 12, 1973 may be used.

The gas, plasma and laser parameters are determined and measured by suitable gages, and/or other instruments, comprising well known laser diagnostics and Langmuir probes, which since they are not part of this invention are not discussed in more detail herein. Also, these parameters are selectively controlled and operated by well known equipment, such as conventional switches, that are understood from the cited patents.

The laser beam self-focuses in the plasma column, which is confined and stabilized across its entire cross-section in the inner tube by the described high B magnetic field, while a high z plasma dopant, corrugated magnetic field modulation provided by the magnetic mirrors, and transparent end plugs reduce the length of the required plasma column for x-ray production by the laser spark provided by the self-focusing laser beam.

The x-rays produced inside the inner tube are soft x-rays produced over a broad band 1–10 keV, and these x-rays pass through the inner tube and into a mixture of Ar and He in the outer tube preferentially and selectively to remove the electrons from the inner shells of the Ar atoms, since Ar strongly absorbs these soft x-rays, i.e. about $10^5$ times more strongly than the He. As electrons are removed from the inner shells of Ar the outer shell electrons fall in and are in turn removed. Electrons will also be removed by the Arger effect once a K shell electron is removed. Thereupon, the stripped Ar ions collide with the He atoms to pull the electrons from the He to the Ar, which then naturally lases strongly to radiate x-rays. This produces an annular output beam of coherent x-rays from the ends of the outer tube along the axis thereof, and these x-rays may be focused if desired by choosing a material target therefor having an energy level near the x-ray photon level, so as to have a strong effect by changing the index of refraction thereof.

EXAMPLE II

The steps of Example I are repeated using a carbon inner tube for blocking ultra violet radiation and transmitting the primary x-rays from the inner plasma column to the outer gas mixture to produce the desired secondary x-rays. Both the Be and carbon inner tubes block the passage of ultra violet radiation therethrough, since such radiation tends to remove the outer shell electrons of the low z atoms in the outer gas.

EXAMPLE III

The steps of example I are repeated using a laser selected from the group of consisting of long wavelength lasers, such as $CO_2$, water vapor and cyanide lasers, and short wavelength lasers, such as neodymium glass lasers.

EXAMPLE IV

The steps of Example I are repeated using a selective dopant for controlling the wavelength of the output secondary x-ray beam. For example, the outer gas used was I and/or Ar with He in the outer gas so that the mixture resonated with the I.

EXAMPLE V

The steps of Example I are repeated wherein the pressure of the inner gas was adjusted to atmospheric pressure or above independently of the field B, and independently of the pressure of the outer gas.

EXAMPLE VI

The steps of Example I are repeated using end filters, comprising glass, Be, or carbon for transmitting x-rays out the end of the outer tube.

EXAMPLE VII

The steps of Examples of I and III are repeated using laser power levels of from 70 joules to 2 megajoule or more.

EXAMPLE VIII

The steps of Example I are repeated using a ½ cm plasma diameter and a 2 mm argon + helium outer gas diameter and a Be inner tube thickness of 1/10 mm that was supported by a collar at either end between the inner and outer tubes.

EXAMPLE IX

The steps of Examples I and VIII are repeated to produce a directed beam of coherent x-rays for probing a small spot for cancer treatment in which the x-ray wavelength is selectively chosen by the filter used at the ends of the outer tube, and/or by adding an element, like iodine that has a highly selective absorption for x-rays. The output x-ray beam is also useful for reflection by a dense material having a surface nearly parallel to the beam for x-ray microscopy, where focusing is provided by refraction, and for holograms where focusing is not required.

EXAMPLE X

The steps of Example I are repeated using a plasma confining field of 300 kG around an annular hole 5 cm in diameter that is pulsed every 1–10 milliseconds, and the x-rays are used directly or amplified with high resolution for x-ray detection of faults in materials.

While the above has described a coherent x-ray source means and method, it will be understood that the apparatus and/or steps of this invention can also be used for providing other x-ray systems, as well as a plasma laser in which parametric resonance is produced in the described plasma, as described in PPL-NSF-1, a report of the Princeton Plasma Physics Laboratory.

This invention has the advantage of providing a beam of coherent x-rays. Moreover, this invention provides a simple apparatus for producing a small, highly directional, collimated and/or resolution x-ray beam for a wide variety of new and existing uses. The mentioned publications are specifically incorporated by reference herein as printed publications available to the PTO at the time the subject application was filed.

What is claimed is:

1. Apparatus in combination with spark means for producing x-rays, consisting of:
    a. a system of coaxial closed, inner and outer container means having concentric walls terminating in opposite ends along an equilibrium axis of rotation for gases having an atomic number Z greater and less than 10;
    b. a first gas means in the inner container means having an atomic number Z less than 10;
    c. a second gas mixture in the outer container means having respective atomic numbers Z greater and less than 10;
    d. electromagnetic spark generating means for selectively producing an ionizing discharge of electromagnetic radiation in the form of a pulse of laser light in the gas in the inner container means to produce x-rays that pass axially through the inner container wall into the gas mixture in the outer container means for selectively ionizing one of the gases therein so as to produce a mixture of highly stripped and neutral atoms along the equilibrium axis in the outer container means for producing secondary x-rays along the equilibrium axis by an atomic process; and e. means for transmitting the secondary x-rays along the equilibrium axis from the ends of the container means.

2. The apparatus of claim 1 having:

a. magnet means on the outside thereof and a coaxial ultra violet ray shield inside said outer container means;
b. transparent means for closing the ends of said container means and said shield means;
c. means for filling said shield means with a first gas;
d. means for filling the first container means with two gases from the group consisting of elements having respectively an atomic number $z$ above and below 10; and
e. laser spark means for heating the first gas inside the shield means along the axis thereof to form a plasma therein that is confined by said magnet means and produces x-rays that pass through the shield means selectively to ionize the heavier element in the first container, the lighter element in the first container forming a neutral gas which transfers electrons to the heavier ionized gas ions on the outside of said shield so that the ions produce x-rays directed along the axis of said first container;

said magnet means for stabilizing said plasma against instabilities.

3. The apparatus of claim 2 in which said spark generating is an infra-red wavelength laser means having means for producing pulses of pre-selected energy and time duration that are self-focused in said plasma.

4. The apparatus of claim 2 in which said magnet means has magnet mirrors for inhibiting the flow of the plasma along the axis of said shield.

5. The apparatus of claim 3 in which instabilities in said plasma are stabilized by means selected from the group consisting of periodic spatial modulation, external magnetic means, feedback stabilization means, and dynamic stabilization means.

6. The apparatus of claim 2 in which said external magnet means produces a theta pinch for producing a plasma density gradient in the radial direction so as to make the plasma focus the laser beam.

7. The apparatus of claim 2 in which said gases in said first container and shield are selected from the group consisting of Ar, He, I and Xe.

8. The apparatus of claim 2 in which said shield is selected from the group consisting of Be and C and other lower $z$ material.

9. In the method of producing x-rays with a laser, the steps of:

a. directing light from a laser means into a gas inside a means for confining the gas along a longitudinally extending axis to produce a plasma that spontaneously emits incoherent first x-rays radially outwardly by atomic processes;
b. maintaining a cold outer annular gas layer around said plasma consisting of a mixture of gases having atomic numbers above and below 10, said plasma producing primary incoherent first x-rays that interact with the cold outer annular gas layer spontaneously to produce second x-rays along said axis by atomic processes; and
c. transmitting said latter second x-rays longitudinally along said axis.

10. The method of claim 9 in which ultra violet rays and x-rays are produced in said plasma and the exchange of said ultra violet rays between said plasma and said cold outer annular gas layer are filtered so as not to ionize the low $z$ component while said primary x-rays are transmitted and preferentially ionize the high $z$ component giving the desired mixture of highly ionized high $z$ ions and unionized low $z$ atoms for producing x-rays.

* * * * *